(12) United States Patent
Tse

(10) Patent No.: US 6,169,533 B1
(45) Date of Patent: Jan. 2, 2001

(54) HIGH SPEED ANALOG COLOR KEY DETECTION TECHNIQUE AND SYSTEM

(75) Inventor: Lawrence Tze-Leung Tse, Fremont, CA (US)

(73) Assignee: Chrontel, Inc., San Jose, CA (US)

( * ) Notice: Under 35 U.S.C. 154(b), the term of this patent shall be extended for 0 days.

(21) Appl. No.: 08/845,599

(22) Filed: Apr. 25, 1997

(51) Int. Cl.⁷ ....................................................... G09G 5/00
(52) U.S. Cl. ............................................. 345/115; 345/113
(58) Field of Search ................................... 345/113, 115, 345/340, 352

(56) References Cited

U.S. PATENT DOCUMENTS 5,526,017 * 6/1996 Wilkie .................................. 345/115

OTHER PUBLICATIONS

Brooktree Corporation, "Bt885 110 Mhz Monolithic CMOS Video CacheDAC™ Product Description", 1993 Graphics & Imaging Product Databook III, 1 page.

Analog Devices, "Ultrafast TTL Comparators AD9696/AD9698", Revision A, 1990–91 Analog Devices Linear Products Databook, pp. 3–13 to 3–19.

\* cited by examiner

*Primary Examiner*—Matthew Luu
(74) *Attorney, Agent, or Firm*—Flehr Hohbach Test Albritton & Herbert LLP

(57) ABSTRACT

A high speed analog color key detection system is disclosed for video/graphics mixing that employs a high speed analog strobe comparator to compare the analog version of a pre-defined color key value to the stream of pixel values in an incoming analog graphics signal. When the comparator indicates a match, the display signal is switched from the analog graphics signal to an incoming analog video signal, enabling the analog video signal to be displayed within a graphics window. Comparisons are triggered by active transitions of a strobe signal with a frequency that is an integer k multiple of the frequency at which the pixel values are generated by a graphics card. Oversampling strobe signals (where the integer k is greater than one) enable comparisons to be performed on small segments of fat pixel values. The strobe signal is generated using a phase locked loop that is synchronized with a horizontal synchronization signal provided by the graphics card. The PLL also regenerates the pixel clock using the horizontal synchronization signal.

31 Claims, 8 Drawing Sheets

HIGH SPEED ANALOG COLOR KEY DETECTION TECHNIQUE AND SYSTEM

The present invention relates generally to video display systems. In particular it pertains to video display systems that allow a video image to be displayed within a window on a conventional graphics image.

BACKGROUND OF THE INVENTION

Mixing of video data with graphics data can be carried out either in the digital domain or in the analog domain. If mixing is performed in the digital domain, as done by the system illustrated in FIG. 1, digital graphics RGB data is sent from the graphics display card 110 to the video card 120 via either the system bus (such as a PCI bus) or an advanced feature connector 114. The video card 120 mixes digital video RGB data and the digital graphics RGB data using display hardware 124 (such as the Brooktree Bt885 video cacheDAC), where video/graphics display switching is controlled by digital color keying. In this system, when the display hardware 124 sees a digital graphics RGB datum (i.e., the 16 or 24 bits that comprise the RGB data for a single pixel) that matches the color key (a programmable value) it displays the analog video RGB data. Otherwise, it displays the analog graphics RGB data.

In add-on card applications including, but not limited to, video capture or Moving Pictures Experts Group (MPEG) systems, graphics/video mixing is commonly performed in the analog domain. Some analog mixing systems employ feature connectors while others do not. Referring to FIG. 2, there is shown a block diagram of a prior art analog system that employs an advanced feature connector 134 to link the graphics and video cards 110 and 140. In such a system, the digital graphics RGB data is digitally passed to the video card 140 via the feature connector 134 along with the graphics PCLK (pixel clock) signal and graphics Hsync (horizontal synchronization) and Vsync (vertical synchronization) signals. Analog graphics RGB data is output to an analog MUX (multiplexer) 142 on the video card 140. A video processor block 144 on the video card 140 generates a SWITCH signal when it detects a match between the color key and the digital graphics RGB data. In response to the SWITCH signal, the analog Mux 142 outputs either the analog graphics RGB data or analog video RGB data generated by the RGBDAC (RBG digital to analog converter) 145 within the analog Mux 142.

Feature connectors have limited data bandwidth and hence limit the graphics resolutions that can be supported. Also, not every graphics card supports feature connectors. For these reasons, a feature-connector-less system for graphics/video mixing is highly desirable. Such a system is shown in FIG. 3. Analog RGB graphics data and the Hsync and Vsync signals are coupled from the graphics card 110 to the video card 170. To achieve the feature-connector-less requirement, a Genlock PPL (phase-locked loop) 172 is used to "genlock" the graphics and the video display cards 160 and 170 based on the Hsync and Vsync signals. Meanwhile, the color key information is detected using programmable analog window comparators 174. As in the systems shown in FIGS. 1 and 2, the analog Mux 178 outputsanalog video RGB data when there is a color key match or the analog graphics RGB data when there is no match.

For sharp transitions between graphics and video display, the speed of analog comparators (such as the comparator 174 of FIG. 3) used for analog color key detection must be sufficiently high. Some prior art designs use high speed comparators (such as the Analog Devices AD9696) to try to satisfy the speed requirement. However, the speed with which a comparator is able to provide proper decisions is also a strong function of the difference between the two signals that it is trying to compare (i.e., faster decisions are possible for signals with greater differences). Therefore, in situations where the graphics data just before the graphics/video display interface are not constant (e.g., where the color changes along the vertical edge of the display interface) it follows that the differences between the graphics data along the interface and the predefined color key are not constant either. As a result the transition between displayed graphics and video regions does not follow a vertical straight line, as shown in FIG. 4, which depicts a graphics screen 210 with an embedded video window 212. Note the rough vertical edges 214 of the video window 212 and corresponding regions of color key leak 216, which is where patches of the color corresponding to the color key are displayed instead of the video image.

Comparators such as the AD9696 are designed using silicon bipolar technology, which is one of the factors underlying their high speed characteristics. Since CMOS devices have lower transconductance (gm) than bipolar devices for a given current the speed of a CMOS comparator is expected to be lower in general than that of an equivalent bipolar comparator. With CMOS technologies being ever more popular, many mixed signal circuits (i.e., circuits that operate on both analog and digital signals) are designed using standard CMOS techniques. Hence, it is important to derive new CMOS design techniques that allow the high speed comparisons necessary to allow sharp transitions between graphics and video display regions.

SUMMARY OF THE INVENTION

In summary, the present invention is a high speed analog color key detection technique and system that can be implemented in graphics/video systems without feature connectors while meeting the needs outlined above.

In particular, the present invention is a high speed analog color key detection system that includes a strobe comparator configured to compare each of a stream of input graphics pixel values in an input analog graphics signal to a color key value in the analog domain upon the occurrence of a predetermined state of a Strobe signal. The Strobe signal frequency is a positive integer k multiple of the frequency of a pixel clock signal that defines the rate at which the input graphics pixel values are provided. In a preferred embodiment, the integer k is a selectable positive integer (with higher values of the integer k enabling the strobe comparator to perform sub-pixel comparison for smaller parts of each of the graphics pixel values) and the Strobe signal and the pixel clock signal are synchronous. So that color key value comparisons are performed following and not during graphics pixel value transitions, the present invention can include a variable delay line that delays the Strobe signal with respect to the pixel clock signal.

The present invention can also incorporate wideband analog buffers coupled between respective input signals (with the color key value and the stream of input graphics pixel values) and the comparator to suppress kickback noise in the input signals caused by operation of the Strobe signal.

In a preferred embodiment, the color key value is defined as all values between the high and low values of color key signals coupled to the strobe comparator. The strobe comparator is configured to compare each input graphics pixel value to the color key value by determining whether the input graphics pixel value is between the high and low values and, when that is the case, asserting a MATCH signal.

The present invention can also include an analog multiplexer with data inputs coupled to an input analog video signal with a stream of pixel values and the input analog graphics signal and a select input coupled to the MATCH signal. As a result, the analog multiplexer outputs the analog video signal when the MATCH signal is asserted and otherwise outputs the analog graphics signal. A preferred embodiment can also incorporate a transmission line with a fixed delay length that is preferably set approximately (e.g., ±5 ns) equal to the delay through the strobe comparator. The transmission line is coupled between the analog graphics signal and the analog multiplexer to better align the analog graphics and video signals.

The present invention can incorporate a phase locked loop configured to generate the Strobe clock signal using an external horizontal synchronization signal as a reference. This same phase locked loop can also be configured to regenerate the pixel clock signal using the horizontal synchronization signal as a reference.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
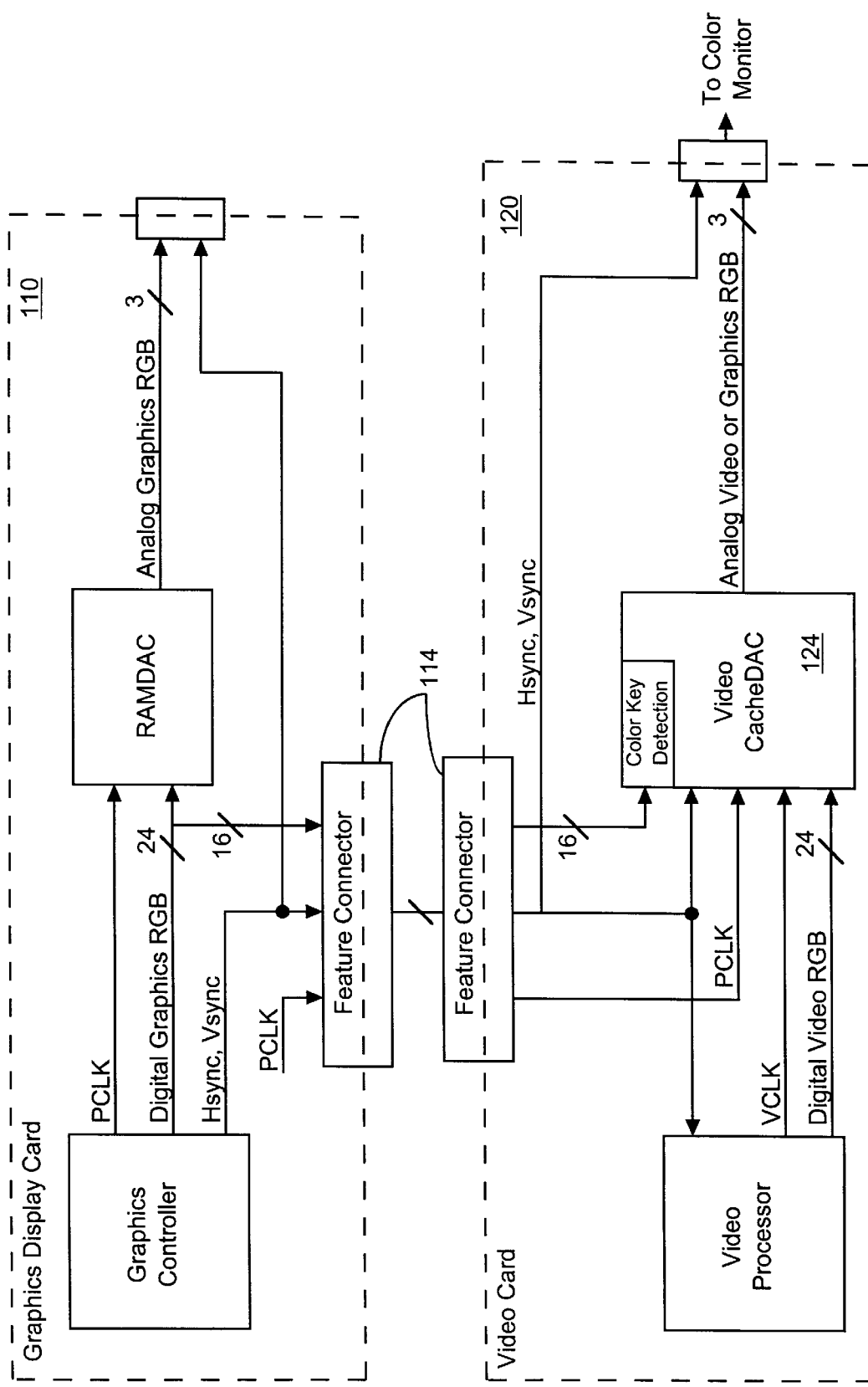
FIG. 1 is a block diagram of a prior art graphics/video system that employs feature connectors and mixes graphics and video data in the digital domain.
Figure 2:
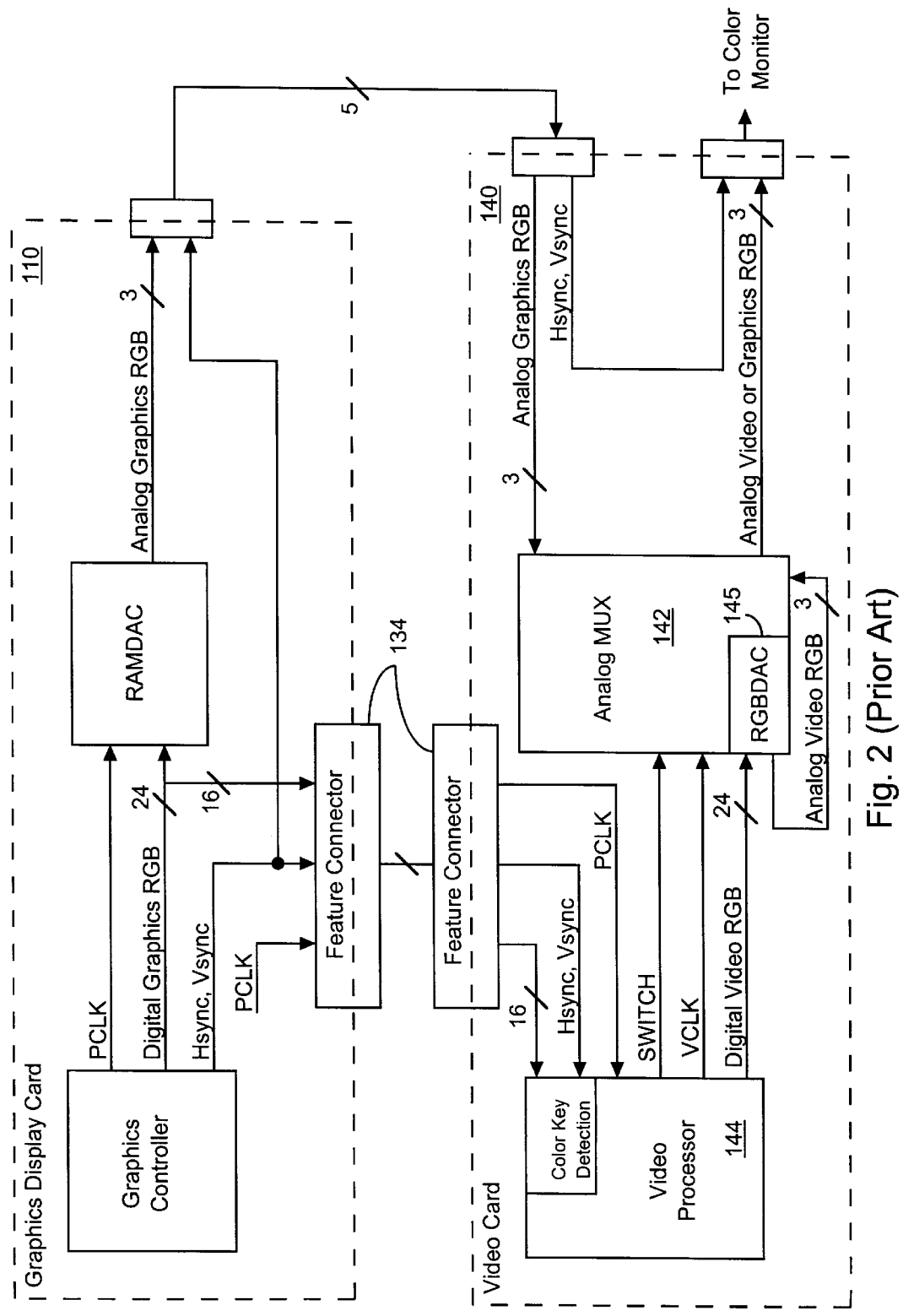
FIG. 2 is a block diagram of a prior art graphics/video system that employs feature connectors and mixes graphics and video data in the analog domain.
Figure 3:
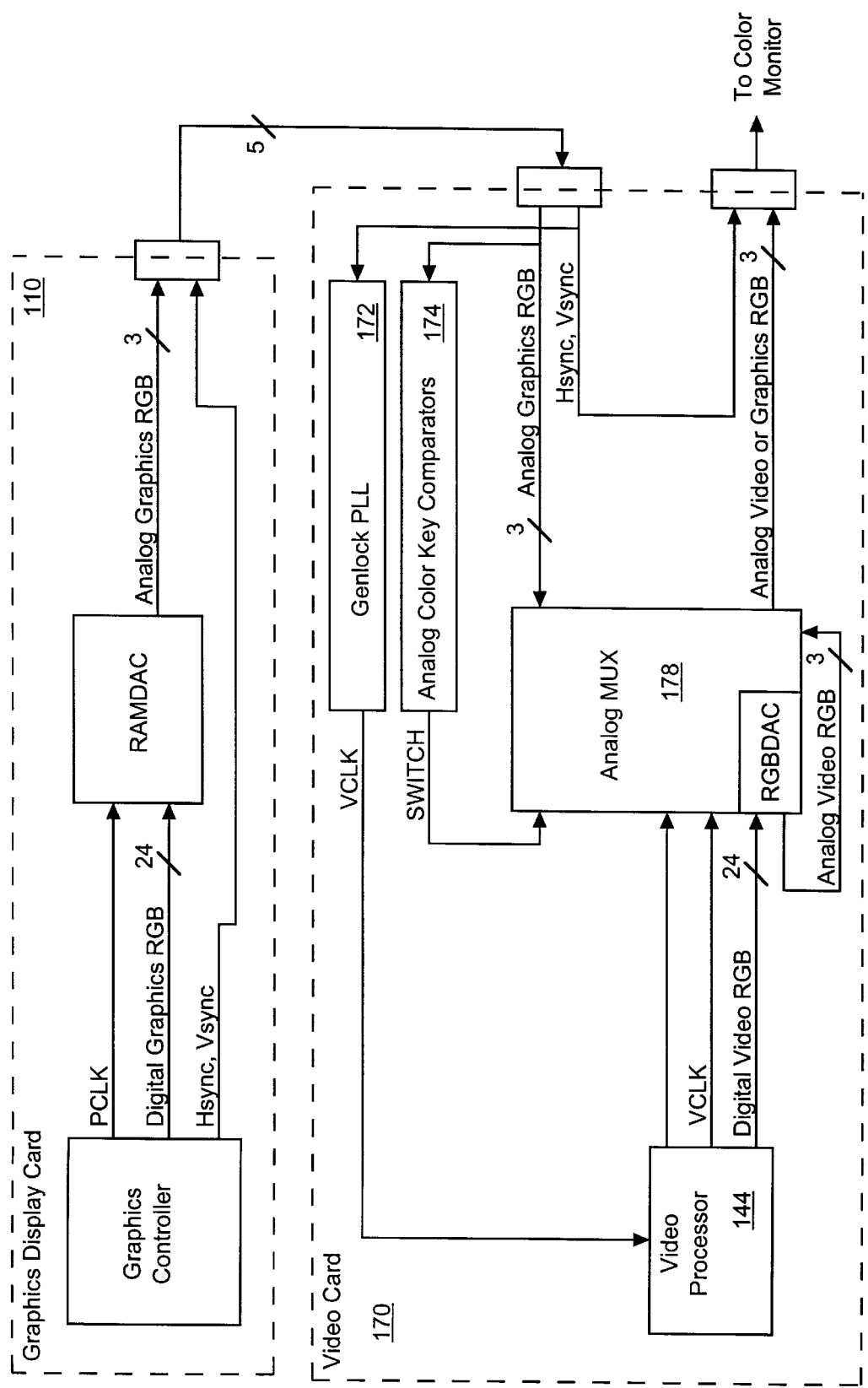
FIG. 3 is a block diagram of a prior art graphics/video system that does not employ feature connectors and mixes graphics and video data in the analog domain.
Figure 4:
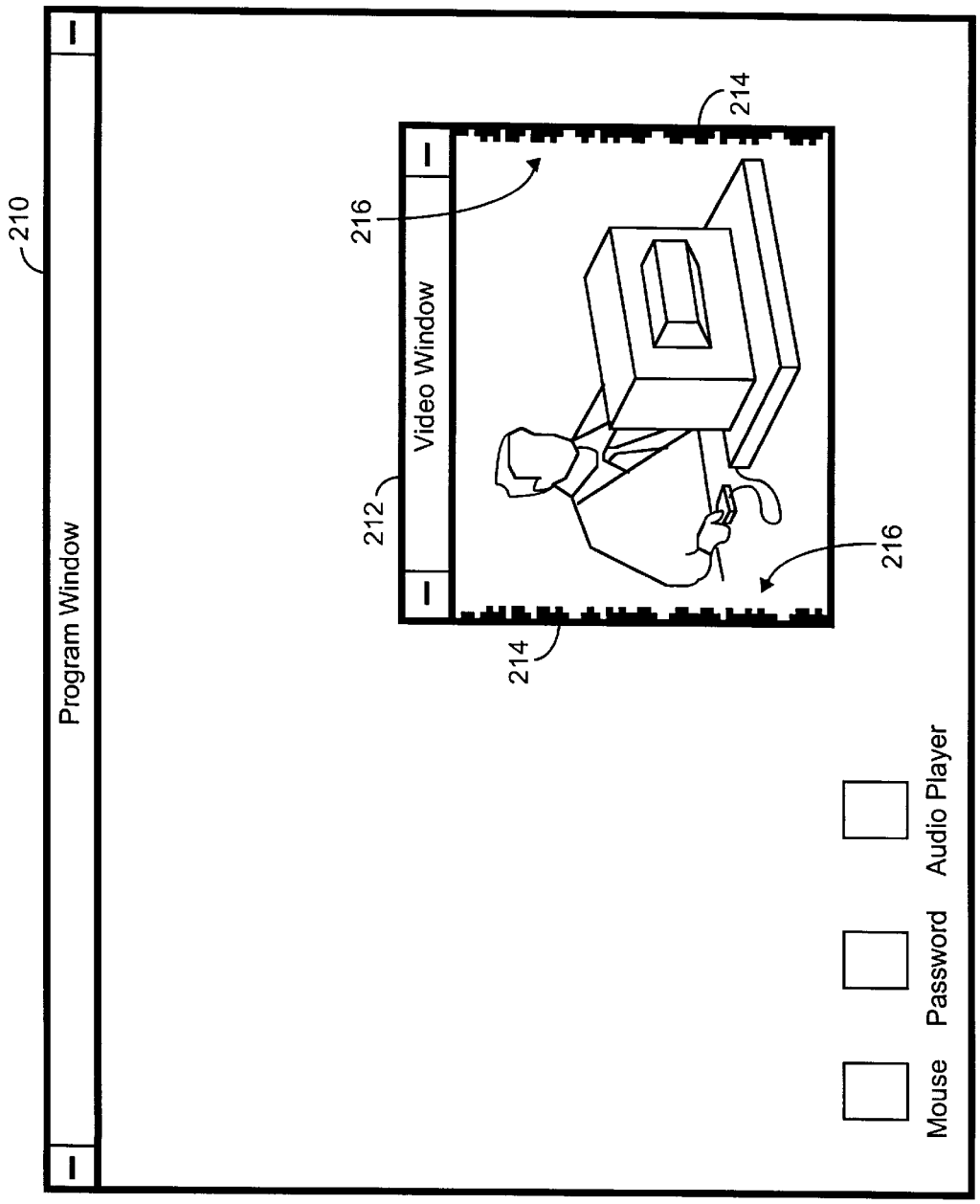
FIG. 4 is depiction of graphics window with an embedded video window that illustrates the color key leak phenomenon that occurs with systems that employ comparators with insufficient bandwidth to handle the required graphics resolution and whose speed is signal-dependent.
Figure 5:
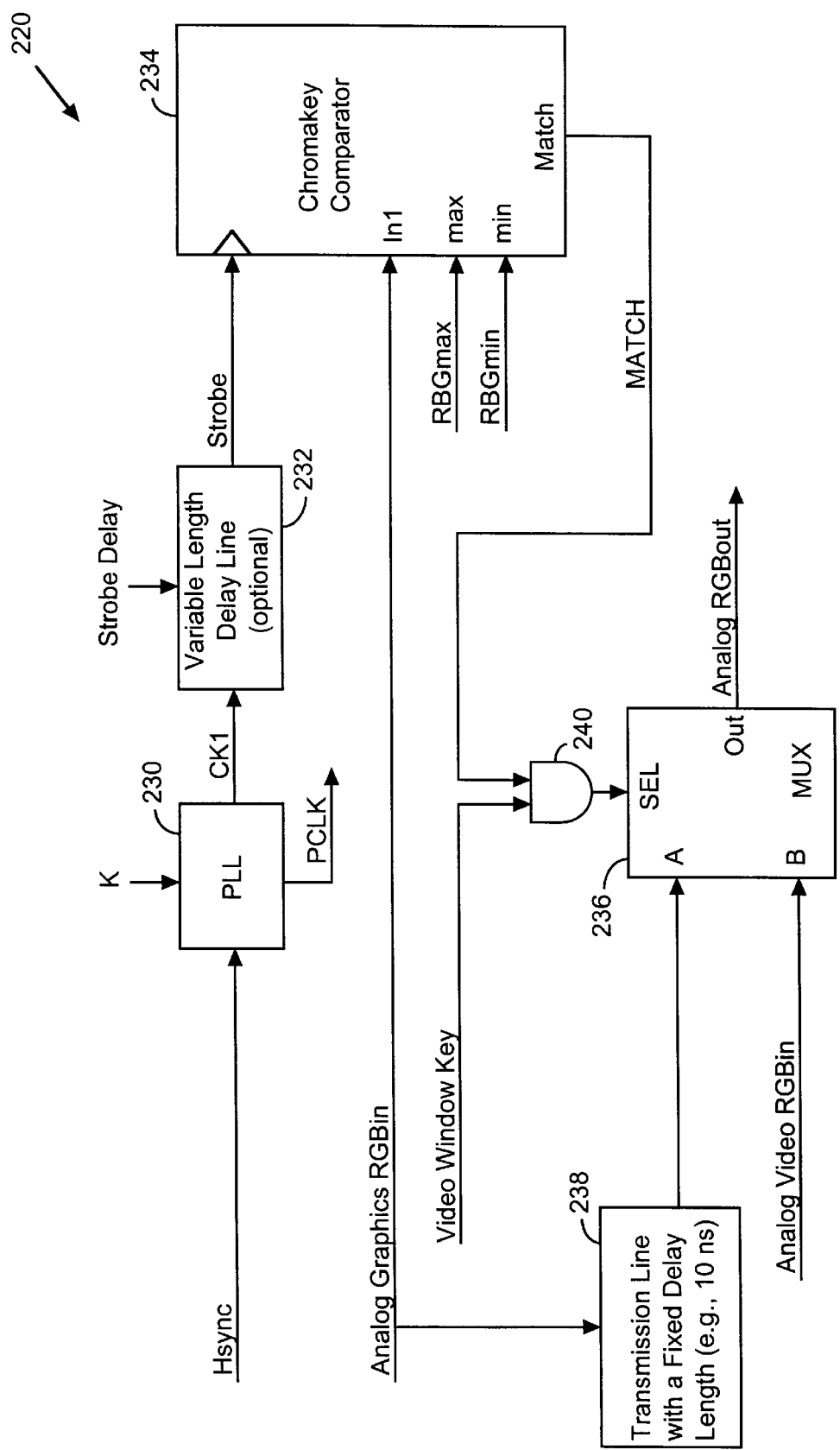
FIG. 5 is a schematic block diagram of a preferred embodiment of a high speed, CMOS, analog color key detection system that can be employed in feature connector-less analog mixing graphics/video display systems.

Referring to FIG. 5, there is shown a schematic diagram of a preferred embodiment of a high speed, CMOS, analog color key detection system 220 that can be employed in feature connector-less analog mixing graphics/video display systems, such as the system of FIG. 3. The system 220 includes a PLL (phase locked loop) 230, an optional variable delay line 232, a chromakey comparator 234, an analog Mux 236 and a transmission line with a fixed delay 238. The PLL 230 generates a clock CK1 signal that is locked to the Hsync signal and has a frequency that is equal to a positive, integer k (typically one, two, three or four) multiple of the frequency of the graphics pixel clock PCLK signal, which is also regenerated by the PLL 230. The optional variable length delay line 232 generates a Strobe signal that is a delayed version of the CK1 signal. The Strobe signal is coupled to the clock input of the chromakey comparator 234 which, upon the occurrence of each high to low (or low to high) transition (i.e., predetermined state) of the Strobe, generates a MATCH signal. The MATCH signal indicates whether a pixel value in a stream of pixel values in the input analog graphics RGBin signal coupled to the In1 input of the comparator 234 is between the high and low values of color key RGBmax and RGBmin signals coupled respectively to the comparator's max and min inputs. The MATCH signal is coupled to a two-input AND gate 240 along with a Video Window Key signal that is asserted when a video window is opened on the display. The output signal of the AND gate 240 is coupled to the select (Sel) input of the analog Mux 236. When both the Video Window Key signal and the MATCH signal are asserted, the Mux 236 outputs the input analog video RGBin signal (at the Mux's B input) as the output analog RGBout signal. Otherwise, the Mux 236 outputs the delayed analog graphics RGBin signal (at the Mux's A input).

The purpose of the optional external transmission/delay line 238 is to compensate for the time required to perform a chromakey comparison, which is about 10 ns or less. By using the external line, the preferred embodiment equalizes the length of the two signal paths: (1) analog graphics RGBin signal to Match signal and (2) analog graphics RGBin signal to Mux. The purpose of the programmable variable length delay line 232 is to shift the strobe time (i.e., transition of the Strobe signal) so that the pixel value of the analog graphics RGBin signal is not sampled and compared with the color key value right at the pixel boundary, at which time the analog graphics RGBin signal is unstable and in transition. The delay may be N×2.5 ns, where NE (0,15) and is identified by the Strobe Delay Signal.

Figure 6:
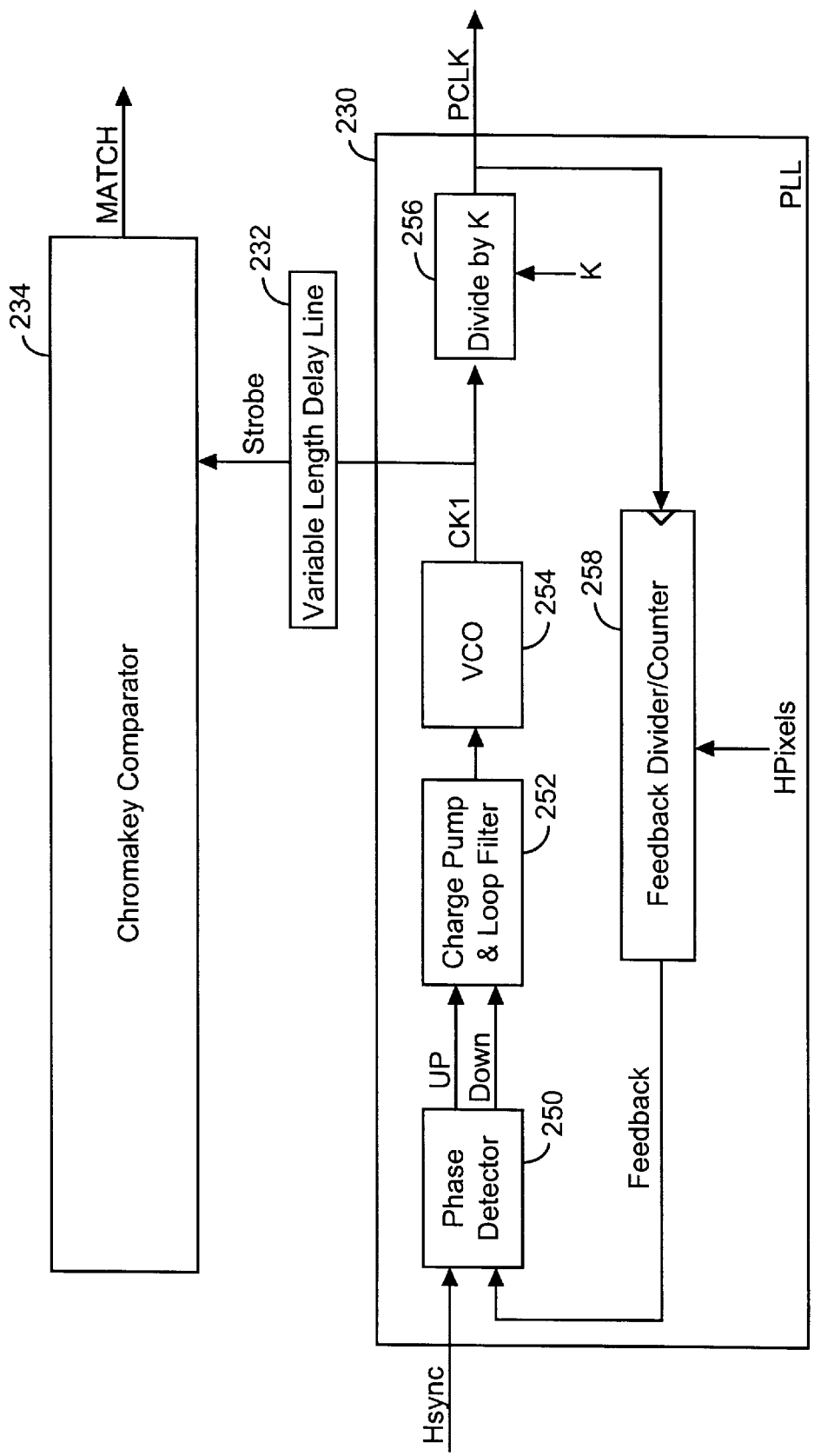
FIG. 6 is a schematic block diagram showing additional details of the phase locked loop of FIG. 5.

Referring to FIG. 6, there is shown a schematic diagram of the PLL 230 of FIG. 5. The design of PLLs is well known. Therefore, details are provided for only those aspects of the PLL 230 that differ from the prior art. The PLL 230 includes a phase detector 250, a charge pump and loop filter 252, a voltage controller oscillator (VCO) 254, a divide-by-k circuit 256 and a feedback divider/counter 258. The integer k is any positive integer and identifies the sampling ratio of the system 220. The integer k is selectable and identified with the k signal provided to the divide-by-k circuit 256. In the preferred embodiment, the CK1 signal generated by the PLL is an oversampling clock signal, meaning that it can have a frequency that is some integer k>1 multiple of the frequency of the PCLK signal. The chromakey comparator 234 only makes a comparison during high phases of the CK1 signal, therefore oversampling enables a reduction in comparison times. This is especially important when the input analog graphics RGBin signal comprises "fat" (i.e., long) pixel values generated at relatively low frequencies. If a comparison were to occur during the entire width of a fat pixel value, long comparison times and commensurately long key leak regions would result. It is now described how the PLL 230 regenerates the PCLK signal and generates the oversampling CK1 signal.

The Hsync signal is coupled to the phase detector 250 as the PLL 230 reference signal. The feedback signal, whose frequency the phase detector 250 compares to the frequency of the Hsync signal, is generated by the feedback divider/counter 258, which counts up to the number of pixel values per horizontal line (HPixels). That is, the feedback signal is taken from an appropriate combination of the counter outputs that indicates that the number of pixels through the divider/counter 258 has reached HPixels. The HPixels value is set to track the graphics display resolution of the graphics card depending on its mode of operation. The counting rate of the divider/counter 258 is determined by the regenerated PCLK signal, which is coupled to the divider/counter's clock input. The PCLK signal is generated by the divide-by-k circuit 256, which ensures that the frequency of the PCLK signal is 1/k times the frequency of the CK1 signal generated by the VCO 254. Together, the division by k and division by HPixels operations ensure that the CK1 signal generated by the VCO makes k*HPixels cycles for each Hsync cycle (i.e., for each line). Moreover, as the Hsync signal is the reference signal for the PLL 230, both the CK1 and PCLK signals are locked to the Hsync signal and are synchronous with each other. This ensures that comparisons by the chromakey comparator 234 are not being made in transition spaces between pixel values.

In summary, the strobe clock CK1 generated by the preferred embodiment has the following characteristics with respect to the PCLK signal:

(1) synchronous with the PCLK signal;
(2) adjustable phase relationship with the PCLK signal; and
(3) oversampling at different integer k multiples of the pixel clock frequency rates to reduce comparison times (where k>1);

In order to support non-interlaced graphics resolutions as high as 1280 pixels by 1024 pixels with a 75Hz refresh rate and restrain the time it takes to make a correct decision to within a single clock cycle, the chromakey comparator 234 must be able to operate at the rate of 135 MHz. In other words, the comparator 234 has to detect and amplify the difference between the input analog graphics RGBin signal and the color key RGBmax and RGBmin signals, make a decision and then recover to get ready for the next comparison within a time of 7 ns or less. The challenge is to derive a design approach that can be applied in standard CMOS technology that supports comparison rates as high as 135MHz while keeping the power consumption low. This challenge is realized in the chromakey comparator 234 which (1) uses the Strobe signal to reset/initialize the voltages within the comparator 234 and (2) uses positive feedback to amplify the differential input signals to be compared. A preferred embodiment of the comparator 234 is now described in reference to FIG. 7.

Figure 7:
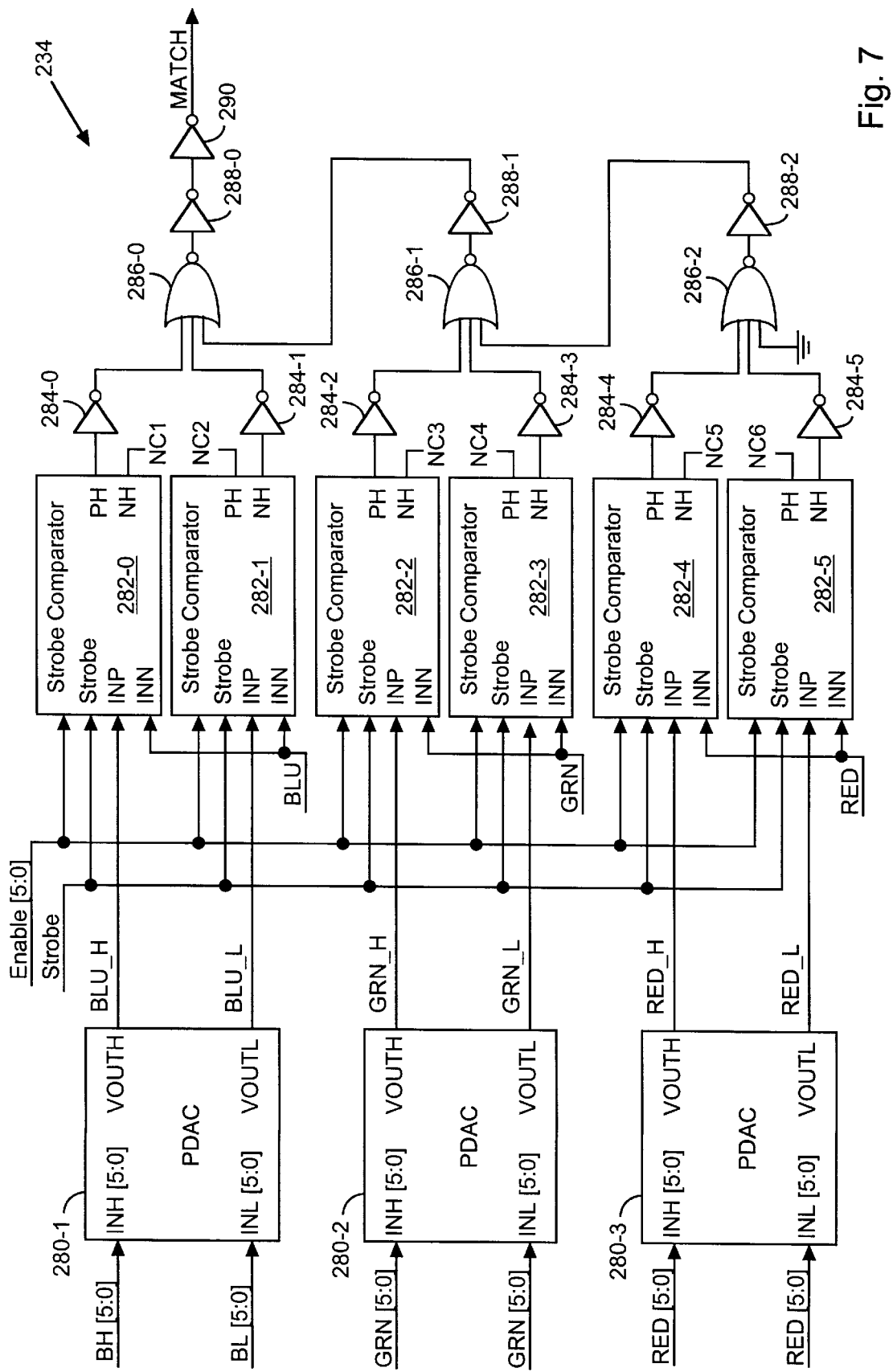
FIG. 7 is a schematic diagram of the chromakey comparator of FIGS. 5 and 6.

Referring to FIG. 7, there is shown a schematic block diagram setting out additional details of the chromakey comparator 234 of FIG. As described above in reference to FIG. 5, the boundaries of the color key value are defined by the values of the RGBmax and RGBmin signals coupled to the chromakey comparator 234. That is, the chromakey comparator 234 declares a match between the pixel value of the analog graphics RGBin signal and the color key value when the value of each element of the analog graphics RGBin signal is between high and low values of a corresponding element from the RGBmax and RGBmin signals. The RGBmax and RGBmin signals' values are typically defined digitally. For example, in the preferred embodiment the RGBmax signal includes 6-bit B, G and R elements referred to herein as BH[5:0], GH[5:0] and RH[5:0]. Similarly, the RGBmin signal includes 6-bit B, G and R elements BL[5:0], GL[5:0] and RL[5:0]. Because the chromakey comparator 234 performs analog comparisons, each of the six digital elements BH[5:0], GH[5:0], RH[5:0], BL[5:0], GL[5:0], RL[5:0] is converted to a corresponding analog range element BLU_H, GRN_H, RED_H, BLU_L, GRN_L, RED_L by a respective one of the PDACs (dual digital to analog converters) 280.

Each of the analog range elements is coupled to a respective strobe comparator 282 along with the corresponding color element from the analog graphics RGBin signal (FIG. 5) and the Strobe signal (FIG. 5). For example, the BLU element of the analog graphics RGBin signal is coupled to the strobe comparators 282-0, 282-1. Each strobe comparator 282 has two outputs: (1) a PH output, which is asserted if the value of the analog range element (coupled to the INP input) is greater than the value of the color element (coupled to the INN input), and (2) a NH output, which is asserted if the opposite condition is true. For the comparators 282-0, 282-2, 282-4, which compare a color element to a corresponding high analog range element (e.g., the BLU and BLU_H elements), the PH output is coupled to an inverter 284 whose output is in turn coupled to a corresponding NOR gate 286. The NH output is not used. For the comparators 282-1, 282-3, 282-5, which compare a color element to a corresponding low analog range element (e.g., the BLU and BLU_L elements), the NH output is coupled to an inverter 284 whose output is in turn coupled to a corresponding NOR gate 286. The PH output is not used. As a result of this configuration, each of the pair of invertors 284 associated with a particular color element generates a low signal when the color element's value is between the corresponding analog range elements' high and low values.

The output of each NOR gate 286 is coupled to an inverter 288. The outputs of the invertors 288-2 and 288-1 are coupled respectively to a third input of the NOR gates 286-1 and 286-0. The third input of the NOR gate 286-2 is grounded. Consequently, if each input color element's value is within range of its corresponding analog range elements' values (in which case the outputs of each of the invertors 284 is low), the output of each of the NOR gates 286 will be high. The output of the inverter 286-0, after being buffered through two invertors 288, 290, forms the MATCH signal that is coupled to the analog Mux 236 (FIG. 5). Thus, only when the output of the NOR gate 286-0 is high (which is the case only if all of the input color elements' values are in range of their corresponding analog range elements' values) is the MATCH signal high.

The above-described operation of the strobe comparators 282 can be modified in at least two ways. In the first modification, each comparator 282 can be selectively enabled by a respective one of the six ENABLE signals so that its output signals PH and NH are asserted at all times. This allows a color key value to be defined using any combination of pixel color elements. For example, a red-only color key value can be implemented by enabling the comparators 282-0, 282-1, 282-3 and 282-4, which perform comparisons on blue and green color elements.

In the second modification, the high and low analog range elements' values can be programmed so that the low value (e.g., BLU-L) is greater than the corresponding high value (e.g., BLU_H). This causes the corresponding comparator 282 to always output an invalid (i.e., no match) signal. It is only necessary that one of the comparators be programmed in this way, assuming that the one comparator has not be enabled as described above.

Figure 8:
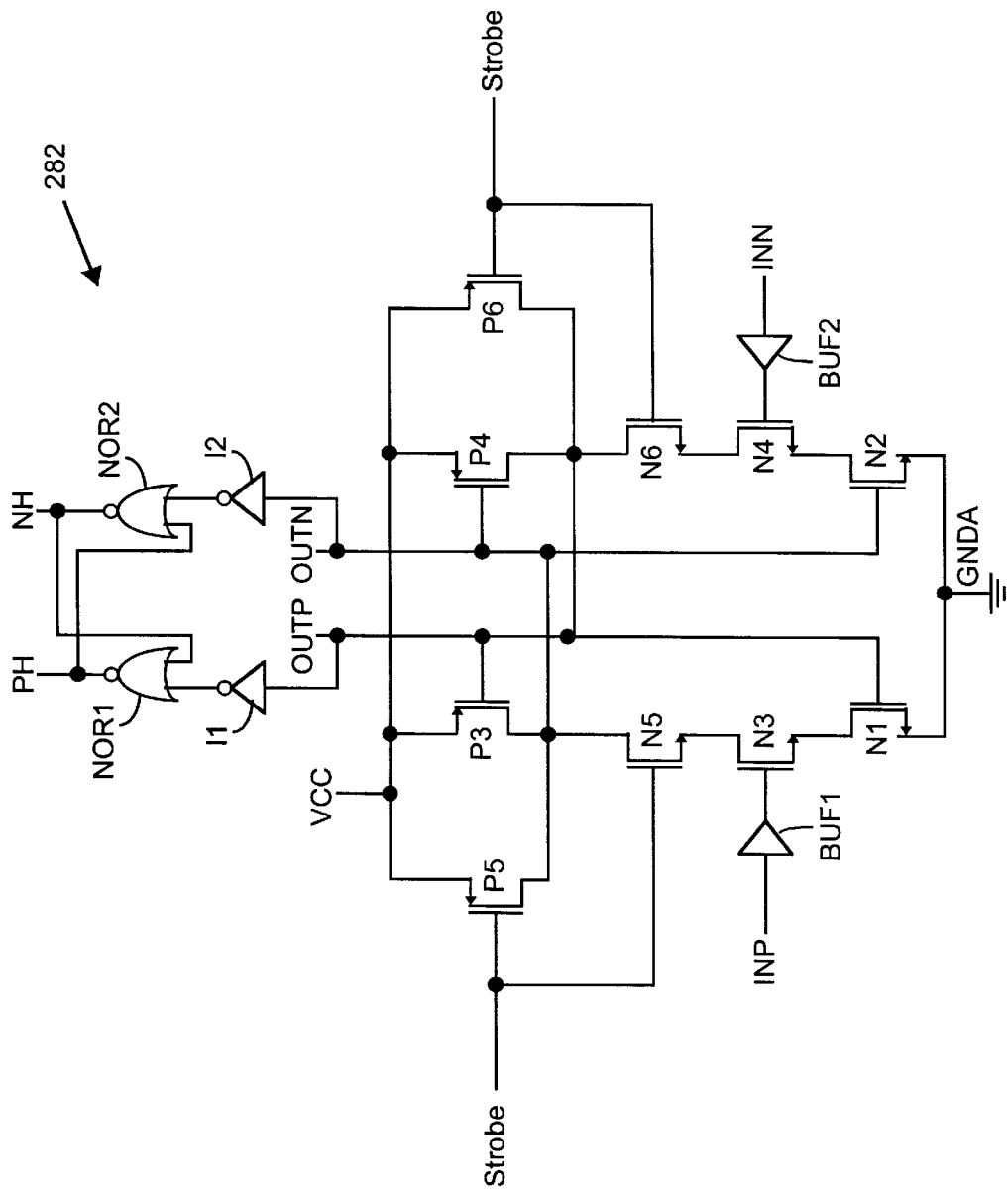
FIG. 8 is a schematic diagram of the strobe comparators of FIG. 7.

Referring to FIG. 8, there is shown a schematic diagram of a preferred CMOS embodiment of the strobe comparator 282 that includes p-channel transistors P3–P6, n-channel transistors N1–N6, two inverters I1 and I2 and two NOR gates NOR1 and NOR2. The Strobe signal is coupled to the gates of the transistors P5, P6 and N5 and N6. The INP signal (i.e., the analog range element) is coupled to the gate of the transistor N3 via a wideband analog buffer BUF1 and the INN signal (i.e., the input color element being compared to the analog range element) is coupled to the gate of the transistor N4 via another wideband analog buffer BUF2. The buffers BUF1 and BUF2 suppress kickback noise that can appear in the INN and INP signals as a result of using a clock signal (i.e., the Strobe signal) to strobe the comparator 282. Corresponding n-channel and p-channel transistors are the same size (e.g., the transistors N3 and N4 are the same size), enabling the relative sizes of the INP and INN signals to be determined by evaluating the differences in the voltages at the OUTN and OUTP nodes.

A comparison occurs when the Strobe signal goes high. When this occurs the transistors N5 and N6 are fully turned on, meaning that the voltages at the OUTN and OUTP nodes are respectively determined by the transistor pairs N3/P3 and N4/P4 though voltage divider action. In particular, when the INP signal is large the transistor N3 turns on strongly, pulling the node OUTN node towards ground (established at the GNDA node) and lowering the gate voltage of the transistor P4. Thus, a strong INP signal also strongly turns on the transistor P4, which pulls up the OUTP node. Similarly, when the INN signal is large, the transistor N4 turns on strongly, pulling the OUTP node towards ground and lowering the gate voltage of the transistor P3. Thus, a strong INN signal turns on the transistor P3 strongly, which pulls up the OUTN node commensurately. Because the pull up transistors and pull down transistors are of equal strength, the voltage at the OUTP and OUTN nodes reflect the relative strength of the respective signals coupled to the INN and INP signals, respectively.

In particular, when the INP signal is larger than the INN signal, the OUTP voltage is higher than the OUTN voltage (this is because the pull down N3 is stronger in relation to the pull up P3 than the pull down N4 is in relation to the pull up P4). When the INP signal is smaller than the INN signal, the OUTP voltage is lower than the OUTN voltage (this is because the pull down N3 is weaker in relation to the pull up P3 than the pulldown N4 is in relation to the pull up P4).

The OUTP and OUTN nodes are coupled respectively to the invertors I1 and I2. If an OUTP or OUTN voltage is above its respective inverter's threshold, the output of the inverter is high. Otherwise the inverter's output is low. Only if the INP and INN signals are significantly different will one or the other of the OUTP and OUTN voltages be above threshold. The circuit is designed so that neither the OUTP voltage nor the OUTN voltage are simultaneously above-threshold during a strobe comparison operation. The output of each inverter I1 and I2 is coupled to one input of a corresponding two input NOR gate NOR1 and NOR2. The other input of each NOR gate is coupled to the output of the other NOR gate. The outputs of the NOR gates NOR1 and NOR2 provide the PH and NH outputs described in reference to FIG. 7. As a result of this cross-coupling, the PH and NH signals can take the following states, each associated with a particular relationship between the INP and INN signals:

| PH | NH | Relationship between INP and INN |
|----|----|----------------------------------|
| 0  | 1  | INN > INP                        |
| 1  | 0  | INP > INN                        |

The Strobe signal is also coupled to the gates of the transistors P5 and P6. This ensures that, whenever the Strobe is inactive, the OUTP and OUTN nodes are each pulled up to the supply voltage VCC, resulting in outputs from the inverters I1 and I2 of 0 and 0. Thus, the states of the latch consisting of the NOR gates NOR1 and NOR2 are not affected when the Strobe signal is inactive.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A chromakey comparator for use in a high speed analog color detection system to detect whether each of a stream of pixel values in an input analog graphics signal compares to a color key value defined by color key signals, the chromakey comparator being configured to:

receive a strobe signal, the input analog graphics signal, and the color key signals, the strobe signal having a frequency that is an integer multiple of the frequency at which the pixel values in the input analog graphics signal are received by the chromakey comparator; and for each of the stream of pixel values, compare the pixel value to the color key value upon the occurrence of a predetermined state of the strobe signal and assert a match signal when a match occurs.

2. The chromakey comparator of claim 1, wherein the color key signals comprise color key maximum and minimum signals having respective maximum and minimum values to define the color key value; and the chromakey comparator is further configured to, for each of the stream of pixel values, compare the pixel value to the maximum and minimum values upon the occurrence of a predetermined state of the strobe signal and assert the match signal when the pixel value is between the maximum and minimum values.

3. The chromakey comparator of claim 2, wherein:

the input analog graphics signal comprises color elements each corresponding to a color, each of the stream of pixel values in the input analog graphics signal comprises a corresponding color value in each of the color elements of the input analog graphics signal;

the color key maximum signal comprises color elements each corresponding to one of the color elements in the input analog graphics signal, the maximum value comprises a corresponding high value in each of the color elements of the color key maximum signal;

the color key minimum signal comprises color elements each corresponding to one of the color elements in the input analog graphics signal, the minimum value comprises a corresponding low value in each of the color elements of the color key minimum signal;

the chromakey comparator is further configured to:

receive the color elements of the input analog graphics signal and the color elements of the color key maximum and minimum signals; and for each of the stream of pixel values in the input analog graphics signal, compare the color value in each of the color elements of the input analog graphics signal to the high and low values for the corresponding color elements in the color key maximum and minimum signals upon the occurrence of a predetermined state of the strobe signal and assert the match signal when the color value is between the high and low values.

4. The chromakey comparator of claim 3, wherein:
the color elements in the maximum and minimum color key signals comprise digital elements;
the chromakey comparator is further configured to:
for each of the color elements in the input analog graphics signal, convert the corresponding digital elements with high and low values in the maximum and minimum color key signals to corresponding analog range elements with the same high and low values;
for each of the stream of pixel values in the input analog graphics signal, compare the color value in each of the color elements in the input analog graphics signal to the high and low values for the corresponding analog range elements upon the occurrence of a predetermined state of the strobe signal and assert the match signal when the color value is between the high and low values.

5. The chromakey comparator of claim 4, comprising:
high value strobe comparators each configured to:
receive the strobe signal, a corresponding one of the color elements of the input analog graphics signal, and a corresponding one of the analog range elements with the high values; and
for each of the stream of pixel values in the input analog graphics signal, compare the color value for the corresponding color element in the input analog graphics signal to the high value for the corresponding analog range element upon the occurrence of a predetermined state of the strobe signal and assert an output signal indicating whether or not the color value is greater than the high value;
low value strobe comparators each configured to:
receive the strobe signal, a corresponding one of the color elements of the input analog graphics signal, and a corresponding one of the analog range elements with the low values; and
for each of the stream of pixel values in the input analog graphics signal, compare the color value for the corresponding color element in the input analog graphics signal to the low value for the corresponding analog range element upon the occurrence of a predetermined state of the strobe signal and assert an output signal indicating whether or not the color value is less than the low value;
match circuitry configured to receive the output signals of the high and low value strobe comparators and generate the match signal from the output signals.

6. The chromakey comparator of claim 4, further comprising dual digital to analog converters each configured to, for a corresponding one of the color elements in the input analog graphics signal, convert the corresponding digital elements with high and low values in the maximum and minimum color key signals to corresponding analog range elements with the same high and low values.

7. The chromakey comparator of claim 4, wherein each of the high and low value strobe comparators comprises wideband analog buffers to suppress kickback noise in the corresponding color element of the input analog graphics signals and the corresponding analog range element caused by strobing the strobe comparator with the strobe signal.

8. The chromakey comparator of claim 1, wherein the chromakey comparator is implemented using CMOS technology.

9. A high speed analog color detection system for detecting whether each of a stream of pixel values in an input analog graphics signal compares to a color key value defined by color key signals, the color detection system comprising:
strobe circuitry configured to generate a strobe signal that has a frequency that is an integer k multiple of the frequency at which the pixel values in the input analog graphics signal are provided to the color detection system; and
a strobe comparator configured to:
receive the strobe signal, the input analog graphics signal, and the color key signals; and
for each of the stream of pixel values, compare the pixel value to the color key value upon the occurrence of a predetermined state of the strobe signal and assert a match signal when a match occurs.

10. The high speed analog color detection system of claim 9, wherein
the color key signals comprise color key maximum and minimum signals having respective maximum and minimum values to define the color key value; and
the chromakey comparator is further configured to, for each of the stream of pixel values, compare the pixel value to the maximum and minimum values upon the occurrence of a predetermined state of the strobe signal and assert the match signal when the pixel value is between the maximum and minimum values.

11. The high speed analog color detection system of claim 10, wherein:
the input analog graphics signal comprises color elements each corresponding to a color, each of the stream of pixel values in the input analog graphics signal comprises a corresponding color value in each of the color elements of the input analog graphics signal;
the color key maximum signal comprises color elements each corresponding to one of the color elements in the input analog graphics signal, the maximum value comprises a corresponding high value in each of the color elements of the color key maximum signal;
the color key minimum signal comprises color elements each corresponding to one of the color elements in the input analog graphics signal, the minimum value comprises a corresponding low value in each of the color elements of the color key minimum signal;
the chromakey comparator is further configured to:
receive the color elements of the input analog graphics signal and the color elements of the color key maximum and minimum signals; and
for each of the stream of pixel values in the input analog graphics signal, compare the color value in each of the color elements of the input analog graphics signal to the high and low values for the corresponding color elements in the color key maximum and minimum signals upon the occurrence of a predetermined state of the strobe signal and assert the match signal when the color value is between the high and low values.

12. The high speed analog color detection system of claim 11, wherein:
the color elements in the maximum and minimum color key signals comprise digital elements;
the chromakey comparator is further configured to:
for each of the color elements in the input analog graphics signal, convert the corresponding digital elements with high and low values in the maximum and minimum color key signals to corresponding analog range elements with the same high and low values;
for each of the stream of pixel values in the input analog graphics signal, compare the color value in each of the color elements in the input analog graphics signal to the high and low values for the corresponding analog range elements upon the occurrence of a predetermined state of the strobe signal and assert the match signal when the color value is between the high and low values.

13. The high speed analog color detection system of claim 9, wherein:
the integer k is a selectable positive integer; and
the strobe circuitry is configured to receive an integer identifying signal identifying the integer k and generate the strobe signal in response.

14. The high speed analog color detection system of claim 13, wherein the integer k is selected to be greater than one.

15. The high speed analog color detection system of claim 13, wherein the strobe circuitry comprises a phase locked loop configured to:
receive an external graphics horizontal synchronization signal for the analog input graphics signal, the integer k identifying signal, and a number identifying signal identifying the number of pixel values per horizontal line for the analog input graphics signal; and
generate a first clock signal synchronous with the horizontal synchronization signal and based on the integer and number identifying signals;
the strobe circuitry is configured to output the clock signal or a delayed version of the clock signal as the strobe signal.

16. The high speed analog color detection system of claim 15, wherein:
the phase locked loop is further configured to generate a pixel clock signal synchronous with the horizontal synchronization signal and based on the horizontal synchronization signal and the integer and number identifying signals, the pixel clock signal defining the frequency at which the pixel values in the input analog graphics signal are provided to the color detection system; and
the strobe circuitry further comprises a variable delay line that delays the first clock signal with respect to the pixel clock signal to generate the strobe signal so that the chromakey comparator performs the comparisons following and not during transitions between pixel values in the input analog graphics signal.

17. The high speed analog color detection system of claim 16, wherein the phase locked loop comprises:
a phase detector configured to generate a first voltage that is a function of phase difference between the horizontal synchronization signal and a feedback signal;
a loop filter configured to generate a second voltage that is a filtered version of the first voltage;
a voltage controlled oscillator configured to generate the first clock signal based on the second voltage;
a divide-by-k circuit configured to generate the pixel clock signal from the first clock signal by dividing the frequency of the first clock signal by the integer k identified by the integer identifying signal; and
a feedback divider/counter configured to generate the feedback signal by counting up to the number of pixel values per horizontal line in the input analog graphics signal at a rate based on the pixel clock signal.

18. The high speed analog color detection system of claim 9, further comprising:
a gate configured to:
receive the match signal and a video window key signal that indicates when a video window is open;
generate an output signal that indicates whether both the match signal and the video window key signal are asserted;
an analog multiplexer configured to:
receive an input analog video signal, the input analog graphics signal, and the output signal; and
output for display in the video window the input analog video signal when the output signal indicates both the match signal and the video window key signal are asserted and otherwise output for display in the video window the input analog graphics signal.

19. The high speed analog color detection system of claim 18, further comprising a transmission line coupled to the analog multiplexer and having a fixed delay length, the transmission line delaying the input analog graphics signal into the analog multiplexer so as to align the input analog graphics signal and the input analog video signal.

20. The high speed analog color detection system of claim 9, wherein the chromakey comparator is implemented using CMOS technology.

21. A method of detecting whether each of a stream of pixel values in an input analog graphics signal compares to a color key value defined by color key signals, the method comprising the steps of:
generating a strobe signal that has a frequency that is an integer k multiple of the frequency at which the pixel values in the input analog graphics signal are provided;
for each of the stream of pixel values, comparing the pixel value to the color key value upon the occurrence of a predetermined state of the strobe signal and assert a match signal when a match occurs.

22. The method of claim 21, wherein
the color key signals comprise color key maximum and minimum signals having respective maximum and minimum values to define the color key value; and
the comparing step comprises the step of, for each of the stream of pixel values, comparing the pixel value to the maximum and minimum values upon the occurrence of a predetermined state of the strobe signal and assert the match signal when the pixel value is between the maximum and minimum values.

23. The method of claim 22, wherein:
the input analog graphics signal comprises color elements each corresponding to a color, each of the stream of pixel values in the input analog graphics signal comprises a corresponding color value in each of the color elements of the input analog graphics signal;
the color key maximum signal comprises color elements each corresponding to one of the color elements in the input analog graphics signal, the maximum value comprises a corresponding high value in each of the color elements of the color key maximum signal;
the color key minimum signal comprises color elements each corresponding to one of the color elements in the input analog graphics signal, the minimum value comprises a corresponding low value in each of the color elements of the color key minimum signal;
the comparing step further comprises the step of, for each of the stream of pixel values in the input analog graphics signal, comparing the color value in each of the color elements of the input analog graphics signal to the high and low values for the corresponding color elements in the color key maximum and minimum signals upon the occurrence of a predetermined state of the strobe signal and assert the match signal when the color value is between the high and low values.

24. The method of claim 23, wherein:

the color elements in the maximum and minimum color key signals comprise digital elements;

the comparing step further comprises the steps of:

for each of the color elements in the input analog graphics signal, converting the corresponding digital elements with high and low values in the maximum and minimum color key signals to corresponding analog range elements with the same high and low values;

for each of the stream of pixel values in the input analog graphics signal, comparing the color value in each of the color elements in the input analog graphics signal to the high and low values for the corresponding analog range elements upon the occurrence of a predetermined state of the strobe signal and assert the match signal when the color value is between the high and low values.

25. The method of claim 21, wherein:

the integer k is a selectable positive integer; and the strobe signal generating step comprises the step of generating the strobe signal in response to an integer identifying signal identifying the integer k.

26. The method of claim 25, wherein the integer k is selected to be greater than one.

27. The method of claim 25, wherein the strobe signal generating step further comprises the steps of:

generating a first clock signal synchronous with an external horizontal synchronization signal and based on the integer identifying signal and a number identifying signal, the number identifying signal identifying the number of pixel values per horizontal line for the analog input graphics signal; and outputting the clock signal or a delayed version of the clock signal as the strobe signal.

28. The method of claim 27, wherein the strobe signal generating step further comprises the steps of:

generating a pixel clock signal synchronous with the horizontal synchronization signal and based on the integer and number identifying signals, the pixel clock signal defining the frequency at which the pixel values in the input analog graphics signal are provided to the color detection system; and delaying the first clock signal with respect to the pixel clock signal to generate the strobe signal so that the comparisons are performed following and not during transitions between pixel values in the input analog graphics signal.

29. The method of claim 28, wherein strobe signal generating step further comprises the steps of:

generating a first voltage that is a function of phase difference between the horizontal synchronization signal and a feedback signal;

generating a second voltage that is a filtered version of the first voltage;

generating the first clock signal based on the second voltage;

generating the pixel clock signal from the first clock signal by dividing the frequency of the first clock signal by the integer k identified by the integer identifying signal; and generating the feedback signal by counting up to the number of pixel values per horizontal line in the input analog graphics signal at a rate based on the pixel clock signal.

30. The method of claim 21, further comprising the step of outputting for display in a video window the input analog video signal when both the match signal and a video window key signal are asserted and otherwise outputting for display in the video window the input analog graphics signal, the video window key signal indicating when the video window is open.

31. The method of claim 30, further comprising the step of delaying the input analog graphics signal so as to align the input analog graphics signal and the input analog video signal for the outputting step.

\* \* \* \* \*